April 6, 1965 A. J. SOCHA 3,176,575
LOW REFLECTANCE OPTICAL MEMBER COATINGS WITH BARRIER LAYER
Filed Dec. 19, 1960
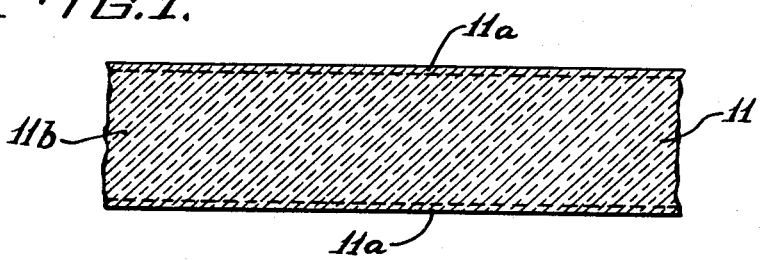
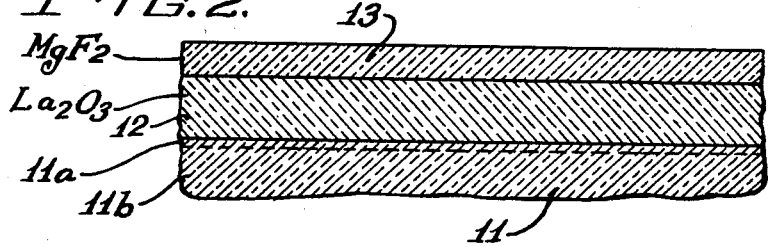
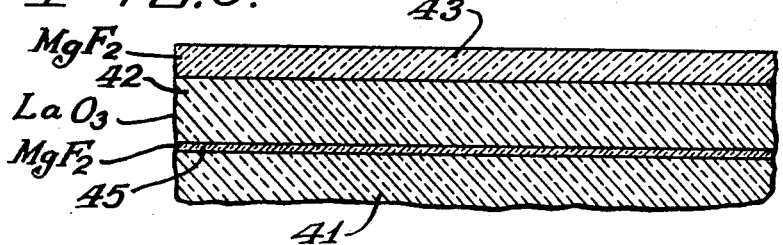
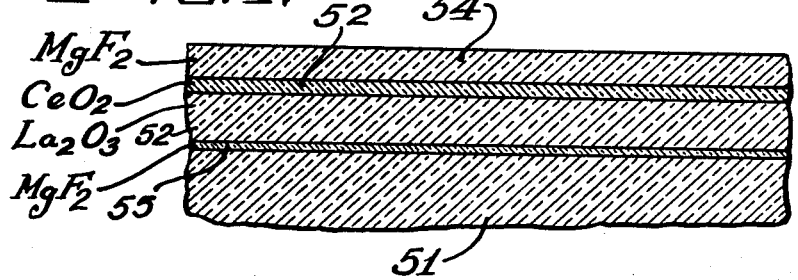
Inventor:
Arthur J. Socha
By Robert F. Michli
Atty.

ated Apr. 6, 1965

3,176,575
LOW REFLECTANCE OPTICAL MEMBER COATINGS WITH BARRIER LAYER
Arthur J. Socha, Wadsworth, Ill., assignor to Bell & Howell Company, Chicago, Ill., a corporation of Illinois
Filed Dec. 19, 1960, Ser. No. 76,755
3 Claims. (Cl. 88—1)

This invention relates to lenses and methods of treating lens surfaces, and more particularly to lenses and methods of passivating surfaces of lenses of high index flint glasses to prepare the surfaces for the application of low reflectance coatings thereto.

In coating lens surfaces with high index low reflectance coatings such as, for example, lanthanum oxide as disclosed in co-pending application Serial No. 11,252, filed February 26, 1960, now abandoned, by Gerhard Lessman and assigned to the common assignee there has been a problem of staining the lens surfaces both prior to the application of the lanthanum oxide and during such application, particularly where the lenses are of high index flint glass, that is flint glass of an index of from about 1.65 to about 1.75.

An object of the invention is to provide new and improved lenses and methods of treating lens surfaces.

Another object of the invention is to provide a lens having an optically negligible barrier layer on a surface thereof of a thickness of from one-thirty-second to one-sixteenth of a wavelength of light together with a low reflectance coating on the barrier layer.

Another object of the invention is to provide a method of treating a lens surface to provide a barrier layer on the surface.

A complete understanding of the invention may be obtained from the following detailed description of lenses and methods of treating lens surfaces forming specific embodiments thereof, when read in conjunction with the appended drawings, in which FIG. 1 is a sectional view of a lens constructed in accordance with a method forming one embodiment of the invention;

FIG. 2 is a fragmentary sectional view of the lens of FIG. 1 with low reflectance coatings thereon;

FIG. 3 is a fragmentary sectional view of a lens forming another embodiment of the invention; and FIG. 4 is a fragmentary sectional view of a lens forming another embodiment of the invention.

The invention provides lenses having surfaces each provided with an optically thin barrier layer together with a low reflectance coating on the barrier layer, the barrier layer serving to prevent staining of the glass by the low reflectance coating. The barrier layer may be formed by vapor plating a suitable material such as, for example, magnesium fluoride on the surface or by subjecting each surface of the lenses to a dilute aqueous solution of an acid such as nitric acid, sulfuric acid or hydrochloric acid until a thin layer or crust of substantially pure silicon dioxide is formed on the lens surfaces.

In FIG. 1 there is shown a lens blank 11 having barrier layers 11a on the opposite surfaces thereof. The barrier layers 11a are leached out or passivated crusts on the glass substrate 11b of the lens blank and are composed essentially of substantially pure silicon dioxide, particularly at the outer surfaces thereof. The layers 11a should be from one thirty-second to one-sixteenth of a wavelength of light in thickness, and prevent staining of the glass by the application of a one-half wavelength low reflectance, high index of refraction layer 12 (FIG. 2), which may be, for example, of lanthanum oxide, by vapor plating. On the layer 12 preferably is vapor plated a layer 13 of a quarter wavelength of light in thickness and of a material having a lower index of refraction than that of the material of the layer 12. The layer 13 preferably is of magnesium fluoride. Certain features of the construction of the layers 12 and 13 are disclosed and claimed in the above-mentioned co-pending application Serial No. 11,252 and my co-pending application Serial No. 76,708, filed on an even date herewith and assigned to the common assignee. The reference wavelength of light for the thicknesses of the layers 11a, and 12 and 13 and throughout this application may be, depending on the intended use of the lens, in the visible spectrum or beyond the visible spectrum into the infrared or ultraviolet regions. In one constructed embodiment of the invention, the reference wavelength was 520 millimicrons.

In forming the barrier layers 11a by passivating the surfaces of the glass, the glass is immersed in a dilute aqueous acid for such a period of time and at such a temperature that the desired thickness of the layers is formed, after which the lens blank is removed, rinsed in water and baked in air at 400° C. for about one hour. The acid may be nitric, sulphuric or hydrochloric and preferably is of a strength of from 1 to 5%.

The barrier layers 11a were formed in one specific example by immersing the lens blank 11, which was of a well known extra dense flint glass of an index of refraction for the sodium $d$ line of 1.72 and an Abbe dispersion number of 29.3, for ten seconds in a 3% solution of nitric acid at 50° C. The lens blank then was taken out, rinsed thoroughly in water and baked in air for one hour at 400° C. The crusts 11a as determined by a known spectrophotometer were one-thirtieth of a wavelength of light in thickness and prevented staining of the surface both from humidity and from the later application of lanthanum oxide thereto. The crusts 11a also are effective to prevent stains from the application of cerium oxide and other low reflectance coating materials directly to the surface of the lens blanks. The films 11a also have been formed by the method involving dilute nitric acid as just described on other extra dense flint glasses, and the method just described is especially effective to prevent staining of extra dense flint glasses both in ordinary usage of the glasses and in the applications of low-reflectance coating materials to the glasses. Other glasses on which the crusts 11a have been formed are the well known extra dense flint glasses having indices of 1.72, 1.649 and 1.751 having respective Abbe dispersion numbers of 29.2, 33.8, and 27.7.

In FIG. 3 there is shown a lens blank 41 on each optical surface of which is applied a very thin barrier layer 45 of a low reflectance coating material having an index of refraction lower than that of the glass, one excellent barrier material being magnesium fluoride vapor-plated onto the surface in a manner well known in the art. The thickness of the layer 45 should be between one thirty-second and one-sixteenth of a wavelength of light so that it has little effect optically but great effect in prevention of stains to the glass-barrier layer surface to which a low reflectance layer 42 is applied. The layer 42 is about .525 of the reference wavelength of 520 milli-microns in thickness and is of a high index material such as, for example, lanthanum oxide. A layer 43 of slightly less than a quarter of the reference wavelength thickness is applied to the layer 42. The layer 43 is of a lower index material such as, for example, magnesium fluoride.

In FIG. 4 there is shown a lens having a low reflectance coating on the optical surface of lens blank 51 with a thin stain-preventing barrier layer 55 therebetween. The low reflectance coating is of the type disclosed in co-pending application Serial No. 76,959, now abandoned, filed by Gerhard Lessman on an even date herewith and assigned to the common assignee, and comprises stepped, high index layers 52 and 53 of a combined thickness of approximately one-half wavelength and an outer low index layer 54 of a quarter wavelength thickness. The layer 52 may be of lanthanum oxide, the layer 53 of cerium oxide and the layer 54 of magnesium fluoride.

The thicknesses of the layers 11a, 45 and 55 may be varied within the range of from one thirty-second to one-sixteenth of a wavelength of light to control the amount of reflection of the central portion of the spectrum in the color of the finished lens, the greater the thickness the more pronounced green. This is a useful tool in giving the same appearance to lenses of different indices.

The barrier layers 45 and 55 are highly effective in preventing stains on the various types of optical glass, both flint and crown. Examples of well known types of glasses with which the layers 45 and 55 are effective in prevention of stain are barium crown glasses having indices of 1.517, 1,611, 1,620, and 1,651 and respective Abbe dispersion numbers of 64.5, 58.8, 60.3 and 58.8 and flint glasses of indices 1.720, 1.649, 1.605, 1.621 and 1.751 with respective Abbe dispersion numbers of 29.2, 33.8, 38.0, 36.2 and 27.7, and the layers 45 and 55 are effective in stain prevention for all types of optical glass.

While the invention is thus described, it is not wished to be limited to the precise details described, as changes may be readily made without departing from the spirit of the invention.

What is claimed is:

1. A low reflectance optical member, which comprises a substrate of extra dense flint glass having a predetermined index of refraction substantially less than that of lanthanum oxide and greater than that of magnesium fluoride and having a barrier layer of substantially pure silicon dioxide not greater than one-sixteenth of a wavelength, a first low reflectance coating on the barrier layer comprising lanthanum oxide of a thickness of approximately one-half of a wavelength, and a second low reflectance coating of magnesium fluoride of a thickness of approximately one-quarter of a wavelength on the first coating.

2. A low reflectance optical member, which comprises a substrate of extra dense flint glass having a predetermined index of refraction, a barrier layer of essentially pure silicon dioxide on the substrate of a thickness between one thirty-second and one-sixteenth of a wavelength of light, a first coating on the substrate having an index of refraction substantially greater than that of the substrate and being approximately one-half of a wavelength of light in thickness, and a second coating on the first coating and of a material of an index of refraction substantially less than that of the first coating and being of a thickness of approximately one-quarter of a wavelength of light.

3. The low reflectance optical member of claim 2 wherein at least the inner portion of the first coating is lanthanum oxide.

References Cited by the Examiner

UNITED STATES PATENTS

| 2,366,516 | 1/45 | Geffcken | 88—1 X |
| 2,397,929 | 4/46 | Dimmick | 88—1 |
| 2,445,238 | 7/48 | Nicoll et al. | 41—42 |
| 2,474,061 | 6/49 | Moulton | 88—1 |
| 2,478,385 | 8/49 | Gaiser | 88—1 |
| 2,834,689 | 5/58 | Jupnik | 88—106 X |

FOREIGN PATENTS

| 1,034,960 | 4/53 | France. |

OTHER REFERENCES

Heavens: 'Optical Properties of Thin Solid Films," published in London by Butterworths Scientific Publications, 1955, pp. 210–213.

DAVID H. RUBIN, *Primary Examiner.*

EMIL G. ANDERSON, *Examiner.*